US012600503B2

(12) United States Patent
Riskas

(10) Patent No.: US 12,600,503 B2
(45) Date of Patent: Apr. 14, 2026

(54) MODULAR, CONFIGURABLE AIRFRAME SYSTEM FOR HEAVY LIFT ROTARY WING UAV

(71) Applicant: Surgeon Autonomous Vehicles and Equipment L.L.C, Arcadia, LA (US)

(72) Inventor: Brian Riskas, Fort Worth, TX (US)

(73) Assignee: Surgeon Autonomous Vehicles and Equipment L.L.C., Arcadia, LA (US)

( * ) Notice: Subject to any disclaimer, the term of this patent is extended or adjusted under 35 U.S.C. 154(b) by 0 days.

(21) Appl. No.: 19/008,417

(22) Filed: Jan. 2, 2025

(65) Prior Publication Data

US 2025/0223059 A1      Jul. 10, 2025

Related U.S. Application Data

(60) Provisional application No. 63/618,069, filed on Jan. 5, 2024.

(51) Int. Cl.
| | |
|---|---|
| *B64U 20/40* | (2023.01) |
| *B64U 10/13* | (2023.01) |
| *B64U 20/70* | (2023.01) |
| *B64U 20/75* | (2023.01) |
| *B64U 30/291* | (2023.01) |

(52) U.S. Cl.
CPC ............. *B64U 20/40* (2023.01); *B64U 10/13* (2023.01); *B64U 20/70* (2023.01); *B64U 20/75* (2023.01); *B64U 30/291* (2023.01)

(58) Field of Classification Search
CPC ........ B64U 20/30; B64U 20/40; B64U 20/70; B64U 7530/291; B64U 7530/292
See application file for complete search history.

(56) References Cited

U.S. PATENT DOCUMENTS

2020/0094960 A1*      3/2020   Wu ...................... B64U 30/291

* cited by examiner

*Primary Examiner* — Nicholas McFall
(74) *Attorney, Agent, or Firm* — Goodhue, Coleman & Owens, P.C.

(57) ABSTRACT

An unmanned aerial vehicle includes an airframe and a plurality of rotor assemblies operatively connected to the airframe and configured to propel the unmanned aerial vehicle. The air frame includes a plurality of tubes and a plurality of hardpoints. Each of the plurality of hardpoints may include a tubular protrusion for receiving one of the plurality of tubes. The unmanned aerial vehicle may further include structural adhesive bonding the tubular protrusion of each of the plurality of hardpoints to a corresponding one of the plurality of tubes.

20 Claims, 12 Drawing Sheets

MODULAR, CONFIGURABLE AIRFRAME SYSTEM FOR HEAVY LIFT ROTARY WING UAV

RELATED APPLICATIONS

This application claims priority to U.S. Provisional Patent Application No. 63/618,069, filed Jan. 5, 2024, hereby incorporated by reference in its entirety.

FIELD OF THE INVENTION

The preset disclosure relates to aircraft, and more particularly, but not exclusively to unmanned aerial vehicles (UAVs).

BACKGROUND

Numerous examples of UAVs have been designed and developed. However numerous problems remain, particularly in the context of heavy lift rotary wing UAVs such as may be useful in applications such as, without limitation, agricultural, forestry, and land base management, aerial heavy lifting military munitions, cargo, and otherwise. Such drones are large in order to provide heavy lift and are costly to design, construct, and maintain. These problems prevent the adoption of UAVs in various contexts. What is needed is a new paradigm for UAV where drones are modular and configurable.

SUMMARY

Therefore, it is a primary object, feature, or advantage to improve over the state of the art.

It is a further object, feature, or advantage to provide a heavy lift done.

Another object, feature, or advantage is to provide an airframe for a heavy lift drone which is modular.

Yet another object, feature, or advantage is to provide an airframe system for a drone which is reconfigurable.

A further object, feature, or advantage is to provide an airframe system that limits or reduces the number of fasteners.

A still further object, feature, or advantage is to provide an airframe system with reduced mass.

Another object, feature, or advantage is to provide an airframe system which may use adhesively bonded structures but eliminates peel loads on the adhesive.

Yet another object, feature, or advantage is to provide an airframe design which is easy to assemble such as by providing minimal numbers of fasteners and minimal touch labor.

It is a further object, feature, or advantage to provide an airframe design which is easy to repair including through the use of common hand tools such as heat guns and the like.

It is a still further object, feature, or advantage to provide an airframe design which may be assembled with a low skill level.

Yet another object, feature, or advantage is to provide an airframe design which may be assembled by technicians trained to apply adhesive and assembly parts.

A further object, feature, or advantage is to provide parts which are self-jigging to minimize the potential for assembly errors.

Another object, feature, or advantage is to provide an airframe design with extremely high stiffness resulting in low airframe vibrations in flight and to improve autopilot performance.

Yet another object, feature, or advantage is to provide an airframe design for a drone which is configurable for different payloads or mission profiles.

Yet another object, feature, or advantage is to provide an airframe design which allows for low cost piece parts.

A further object, feature, or advantage is to provide an aerial drone which has common parts which benefit of manufacturing scale.

A still further object, feature, or advantage is to provide an aerial drone which does not require specialized manufacturing tools or processes and instead uses widely available materials, tools, and manufacturing processes.

Another object, feature, or advantage is to provide an aerial drone which is configured to provide simplified maintenance, transport, and repair.

Yet another object, feature, or advantage is to provide an aerial drone with pre-engineered fracture points.

One or more of these and/pr other objects, features, or advantages will become apparent from the specification and claims that follow. No single embodiment need provide each and every object, feature, or advantage. Instead, different embodiments may have different objects, features, or advantages.

According to one aspect, an unmanned aerial vehicle includes an airframe and a plurality of rotor assemblies operatively connected to the airframe and configured to propel the unmanned aerial vehicle. The air frame includes a plurality of tubes and a plurality of hardpoints. Each of the plurality of hardpoints may include a tubular protrusion for receiving one of the plurality of tubes. The unmanned aerial vehicle may further include structural adhesive bonding the tubular protrusion of each of the plurality of hardpoints to a corresponding one of the plurality of tubes. The plurality of hardpoints may include a subset of hardpoints configured to place corresponding ones of the plurality of tubes at a first angle and a subset of the hardpoints configured to place corresponding ones of the plurality of tubes at a second angle, the first angle different from the second angle. Each of the plurality of tubes may be a carbon tube. Each of the plurality of hardpoints may be metallic. The unmanned aerial vehicle may further include a tank operatively connected to the airframe. The unmanned aerial vehicle may further include a sprayer operatively connected to the tank. The unmanned aerial vehicle may further include a control system operatively connected to the plurality of rotor assemblies. The unmanned aerial vehicle may further include at least one sensor positioned within at least one of the plurality of tubes such as an inertial sensor such as an accelerometer. The unmanned aerial vehicle may further include wiring, fuel lines, or other conduits extending through the plurality of tubes.

According to another aspect, a method of configuring an unmanned aerial vehicle in a first configuration is provided. The method includes providing plurality of carbon tubes and a plurality of metallic hardpoints, wherein the plurality of metallic hardpoints comprises a first subset having a tubular protrusion at a first angle and a second subset having a tubular protrusion at a second angle, the first angle different from the second angle. The method may further include the step of assembling an airframe by structurally bonding individual ones of the carbon tubes to corresponding ones of the plurality of metallic hardpoints to form an airframe of a desired configuration. The method may further include routing at least one of tubing, wiring, and fuel lines through the plurality of carbon tubes. The method may further include positioning at least one sensor within at least one of the plurality of carbon tubes. The method may further include connecting a payload to the airframe, connecting mission specific components to the airframe. For example, the method may include connecting a tank and a sprayer. The method may further include reconfiguring the unmanned aerial vehicle after a mission by heating structural bonds between the carbon tubes and the plurality of metallic hardpoints to separate and assembling the airframe in a second configuration, the second configuration different from the first configuration.

DETAILED DESCRIPTION

Figure 1:
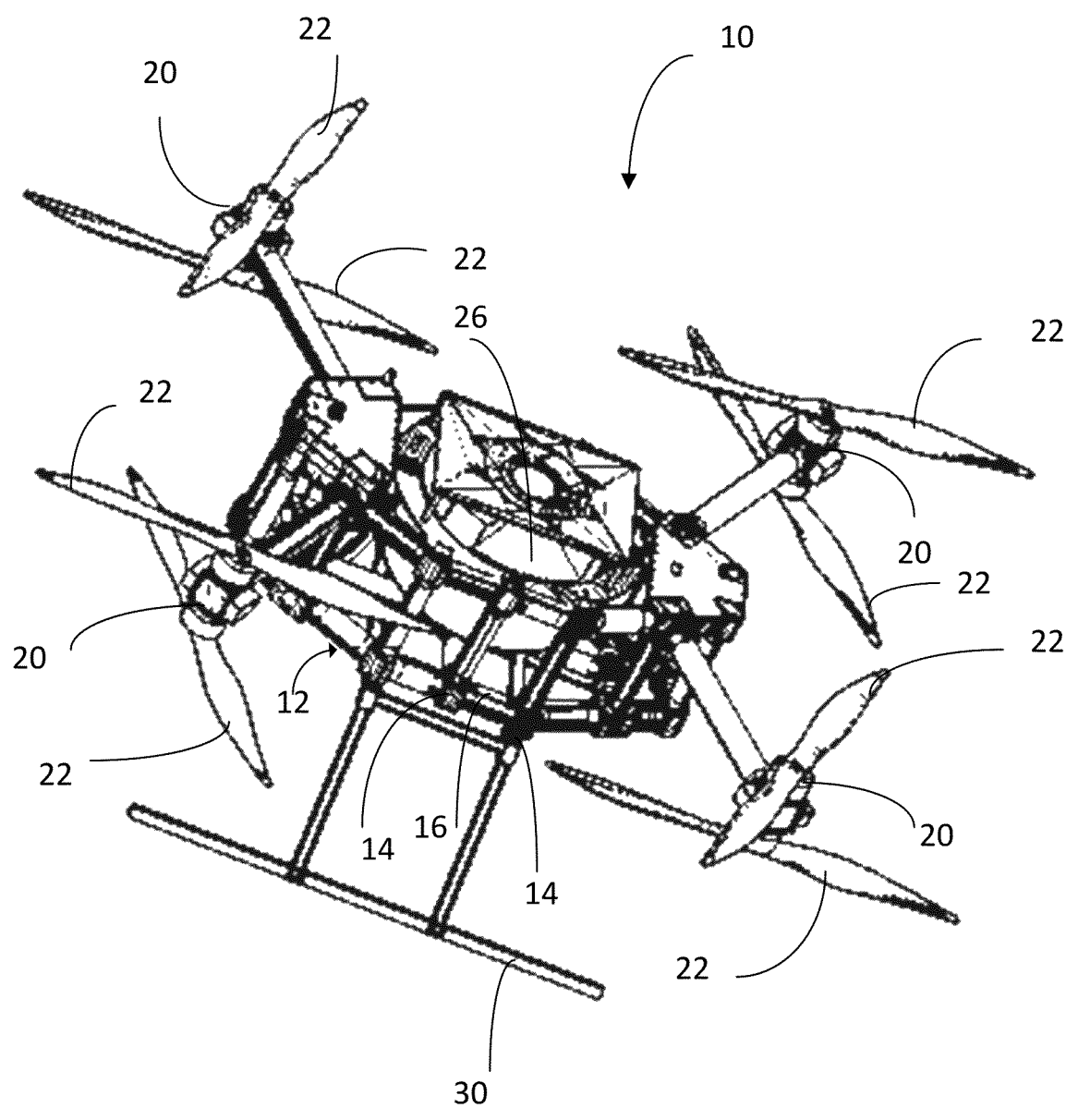
FIG. 1 illustrates one example of an unmanned aerial vehicle or drone.

FIG. 1 illustrates one example of an unmanned aerial vehicle or done 10. The drone 10 is configured as a spray drone for performing spraying operations such as may be associated with various agricultural, forestry, or land management applications. For example, the drone 10 shown may be used to apply pesticides or other farm chemicals. It is to be appreciated that other missions for a drone may include other types of pesticide or fertilizer applications, seeding such as by firing germinated seed pods at a sufficient velocity to place them under the soil, imagery acquisition such as acquire imagery which may be evaluated to determine where pesticides should be applied or other operations should occur, or other types of missions as may be associated with drone usage.

The drone 10 includes an airframe 12 which may be formed from a plurality of tubes 16 and hardpoints 14 as will be explained in more detail. Also shown are a plurality of rotor assemblies 20, each of which may include one or more propellers 22 to provide propulsion forces. Landing gear 30 is also shown. A spray tank 26 is also shown which is surrounded by the airframe.

Figure 2:
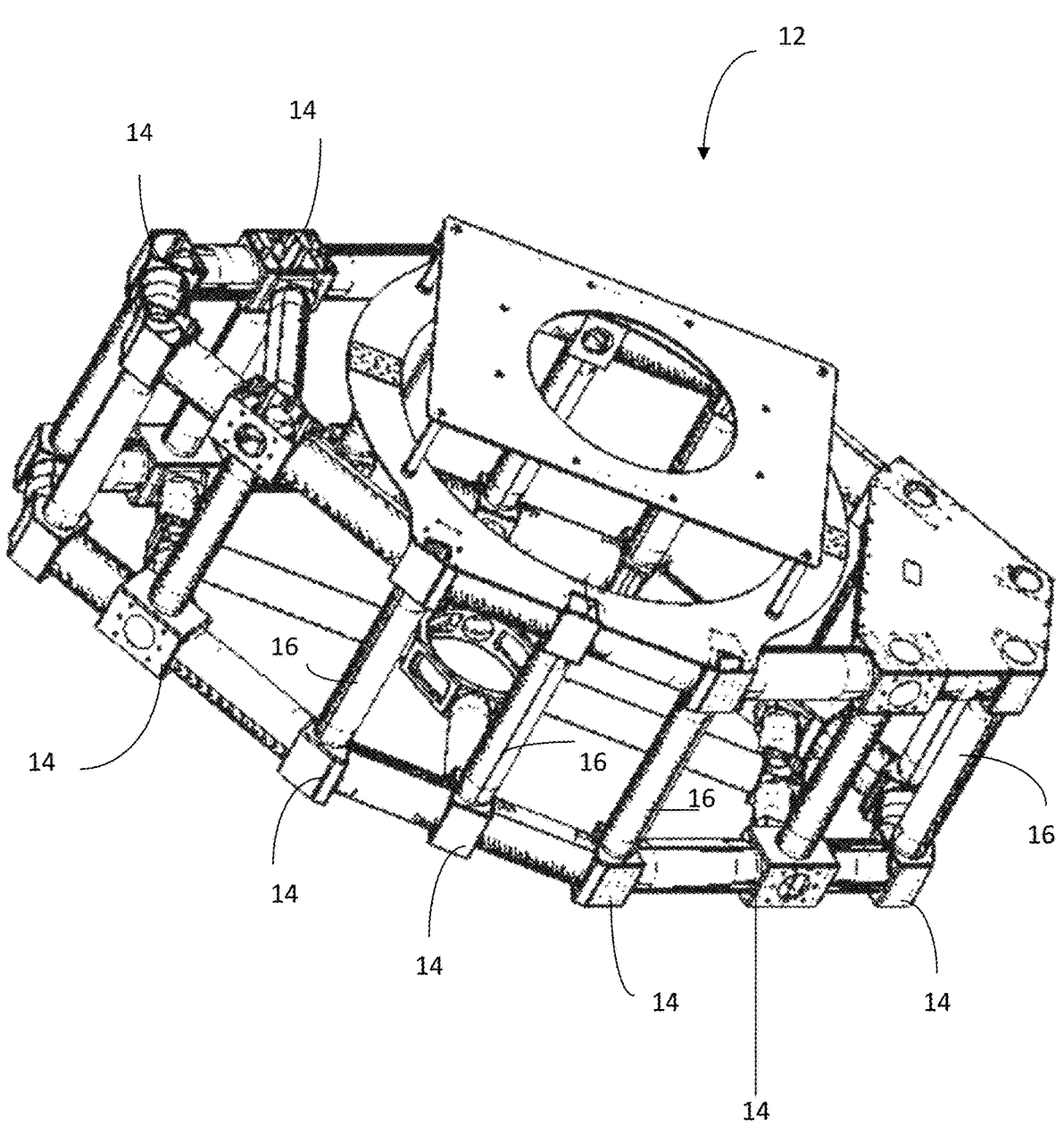
FIG. 2 illustrates an airframe for the unmanned aerial vehicle or drone.

FIG. 2 illustrates the airframe 12 in more detail. As previously explained, the airframe includes a plurality of tubes 16 and hardpoints 14. Each of the plurality of tubes is generally relatively large in size and may be formed from a strong but lightweight composite such as carbon fiber or other composite material. Each of the hardpoints 14 is preferably formed from metal or other strong and rigid material such that the hardpoints 14 maintain stiffness and do not bend or deform during flight of the drone.

Depending upon the particular mission or operations of a drone different configurations of airframe may be desirable. Here, for purposes of a spray done, the airframe should be configured so as to safely carry a tank of chemicals. In order to accommodate such a payload, the airframe may arrange the plurality of tubes around the tank area.

Figure 3:
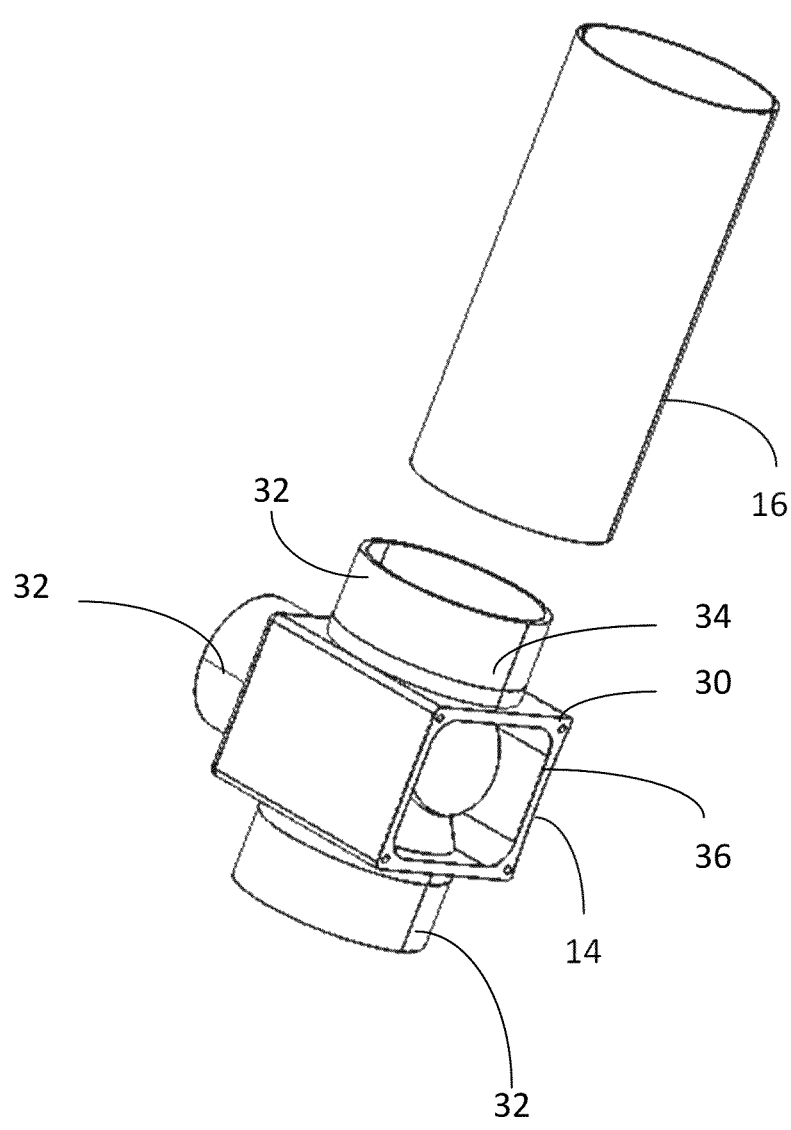
FIG. 3 illustrates a hardpoint for connecting at least one tube.

FIG. 3 further illustrates a hardpoint 14 and a tube 16. The hardpoint 14 has a body 30 with a plurality of tubular protrusions 32 extending therefrom. As shown in FIG. 3, the tubular protrusions 32 are arranged in a T-configuration. However, the tubular protrusions 32 may be arranged in any number of other configurations such as wye configurations, or any different number of tubular protrusions and angle of tubular protrusions. In some embodiments, the hardpoint 14 may be larger to accommodate the number of tubular protrusions 32 or the positioning of the tubular protrusions 32. The tubular protrusions 32 are sized and shaped such that corresponding ones of the tube 16 fit over the tubular protrusion. It is preferred that a structural adhesive 34 be used on an outside surface of the tubular protrusion and/or an inside surface of the tube 16. Thus, a hardpoint 14 may be secured to one or more tubes 16.

As shown in FIG. 3, each of the tubular protrusions is cylindrical in nature. However, any number of different shapes and geometries may be used for the tube 16 and thus the corresponding tubular protrusions 32. For example, the cross-section of both may be square, octagonal, or of other shape. In some embodiments, the tubes may be shaped as an airfoil and show the tubular protrusions would have an associated matching airfoil shape.

The body 30 may also have an open end 36 such as shown in FIG. 3. Thus, even when each tubular protrusion 32 has an attached tube 16, access may be provided inside of the hardpoint 14 such as to run wires, harnesses, tubing, lines, place electronics to protect the electronics from the environment or from vibration, or to access wiring, harness, tubing, lines, or electronics previously positioned. In some embodiments, a cover (not shown in FIG. 3) may be used to cover the open end 36.

Figure 4:
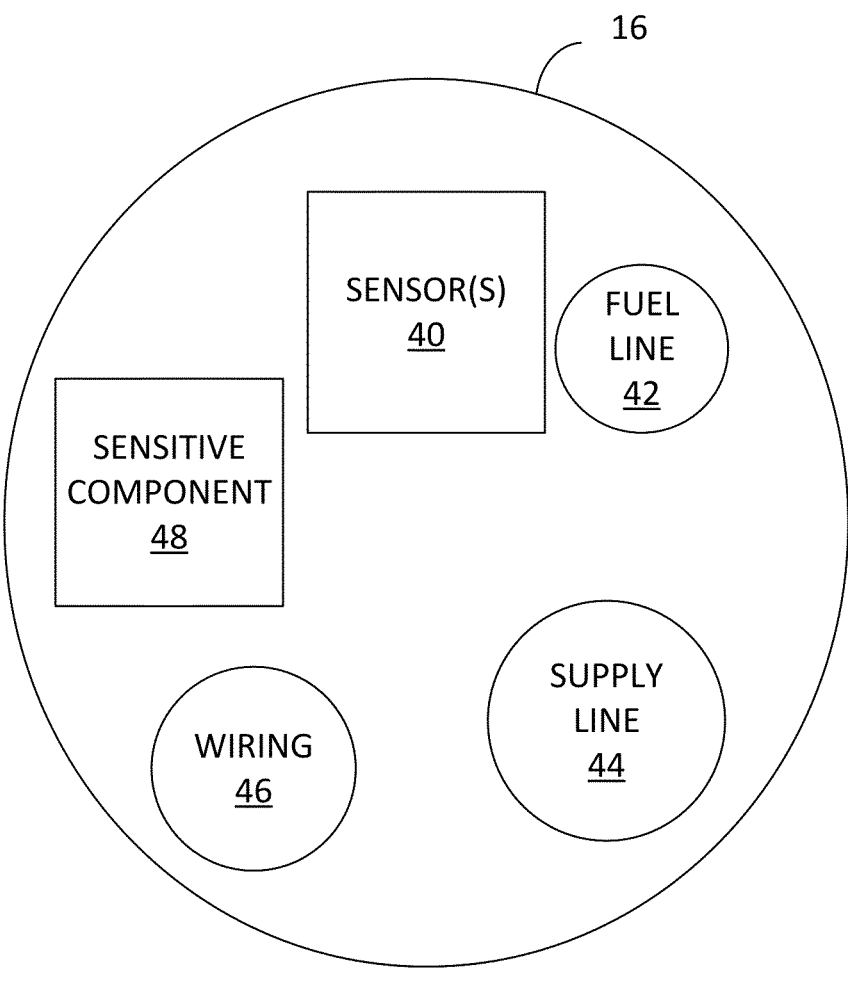
FIG. 4 illustrates a cross-section of a tube in which various lines, conduits, or components may be positioned.

FIG. 4 is a cross-section view of one example of a tube 16. Because the diameter of the tube 16 is relatively large there is sufficient space to run various types of lines through the tube 16. This may include a fuel line 42, wiring 46, a supply line 44 such as to supply a chemical solution between a tank and a sprayer, or other type of line or conduit. In addition, one or more sensors 40 may be present such as inertial sensors such as accelerometers. Accelerometers are highly sensitive to vibrations and indeed are used to measure vibration. Thus, when accelerometers are being used to monitor flight operations, it is advantageous to place the accelerometers to reduce vibrations including wind noise. Other sensitive components 48 may also be placed within a tube 16. It is to be understood that different tubes may have different lines or conduits or components running through them or placed within them.

As previously explained, the airframe may be formed from a number of tubes such as large diameter carbon fiber tubes bonded to a series of modular metallic hardpoints. The hardpoints feature tubular protrusions that allow the carbon tubes to slide over the feature. The carbon tubes are attached to the hardpoints with a structural adhesive (epoxy or similar material). The hardpoints are shaped in such a way to place the tubes at specific angles to allow for the construction of various frame shapes/configurations using a minimal number of unique parts. The overall cost of the frame system is reduced by using common parts across multiple locations/configurations of the frame assembly.

Figure 8:
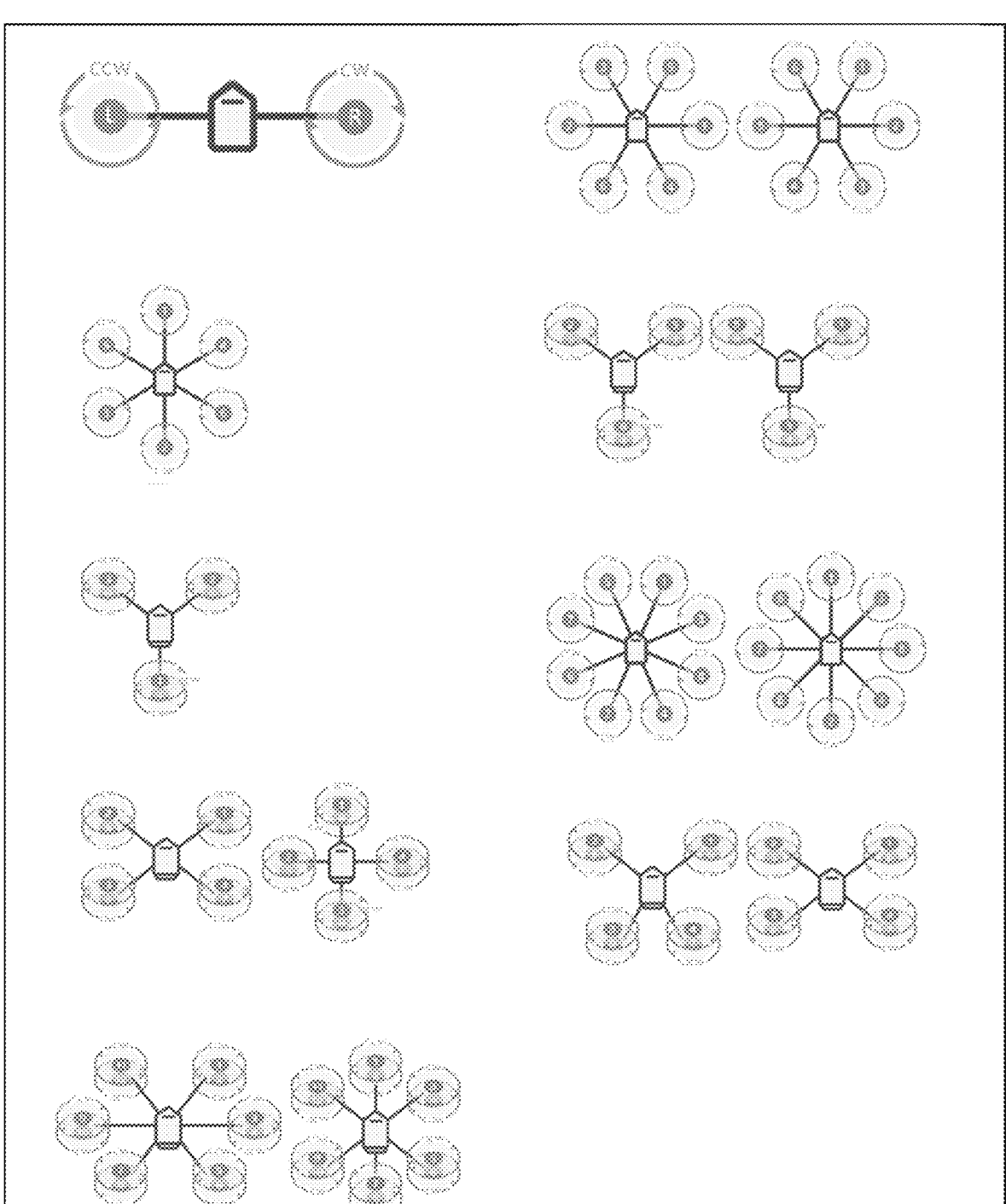
FIG. 8 illustrates non-exhaustive examples of configurations for multi-rotor copters.

It is to be further understood that the airframe may have any number of different configurations. FIG. 8 illustrates some of the many different configurations. Examples of different configurations include, without limitation, Bicopters, Tricopters, Quadcopters, Hexacopters, Octocopters, and Dodecacopters. This designation indicates the number of rotor present. Additional descriptors may be used to indicate the particular placement or arrangement, and sometimes rotations. So configurations may further include, for example, Quadcopter (Quad-X), Quadcopter (Quad-Plus), Hexacopter (Hexa-X). Hexacopter (Hexa-Plus), Hexacopter (Hexa CWX), Octocopter (Octo-X), Octocopter (Octo-Plus), Y6 Copter, V-Tail Quadcopter, Octocopter (Quad V), Dodecacopter (Dodeca Hexa X), Dodecacopter (Dodeca Hexa +), Y6F, Y6B, Y6A, amongst others. What is shown and the designations provided are merely representative as different numbers of rotors and different arrangements of rotors are contemplated.

The assembly of the frame is simple. First, the assembler applies adhesive to the interior of the carbon tube and the cylindrical feature on the hardpoint. Second, the carbon tube is slid over the cylindrical feature on the hardpoint. The two parts are then held still until the epoxy cures/hardens. There are no fasteners or rivets on the main structure. The use of adhesive reduces the overall parts count and touch labor on the airframe.

If the hardpoint or frame is damaged during operation, the parts can be removed from each other by heating the epoxy with a heat gun or in an oven, weakening the epoxy bond. Once the epoxy is heated, the parts can be separated easily by hand. The old epoxy is then removed, and new parts/epoxy are used to repair the frame without having to re-work the entire assembly.

Due to the relatively simple nature of the assembly process, the frame can be assembled quickly by personnel with minimal training. The design of the hardpoint and tube ensures high strength bonds without the need for precision assembly jigs and fixtures.

The frame assembly exhibits extremely high stiffness when compared to traditional methods of airframe construction (usually consisting of tubes and plates bolted together with spacers and standoffs). The large diameter of the carbon tubes allows the vehicle's wiring, cables, tubing, fuel lines and other sensitive components to be routed inside the frame for protection and safety during flight operations. The high stiffness minimizes airframe vibration and improves auto-pilot performance (the autopilot sensors are sensitive to vibration and cannot distinguish between vibration and vehicle attitude changes).

Figure 5:
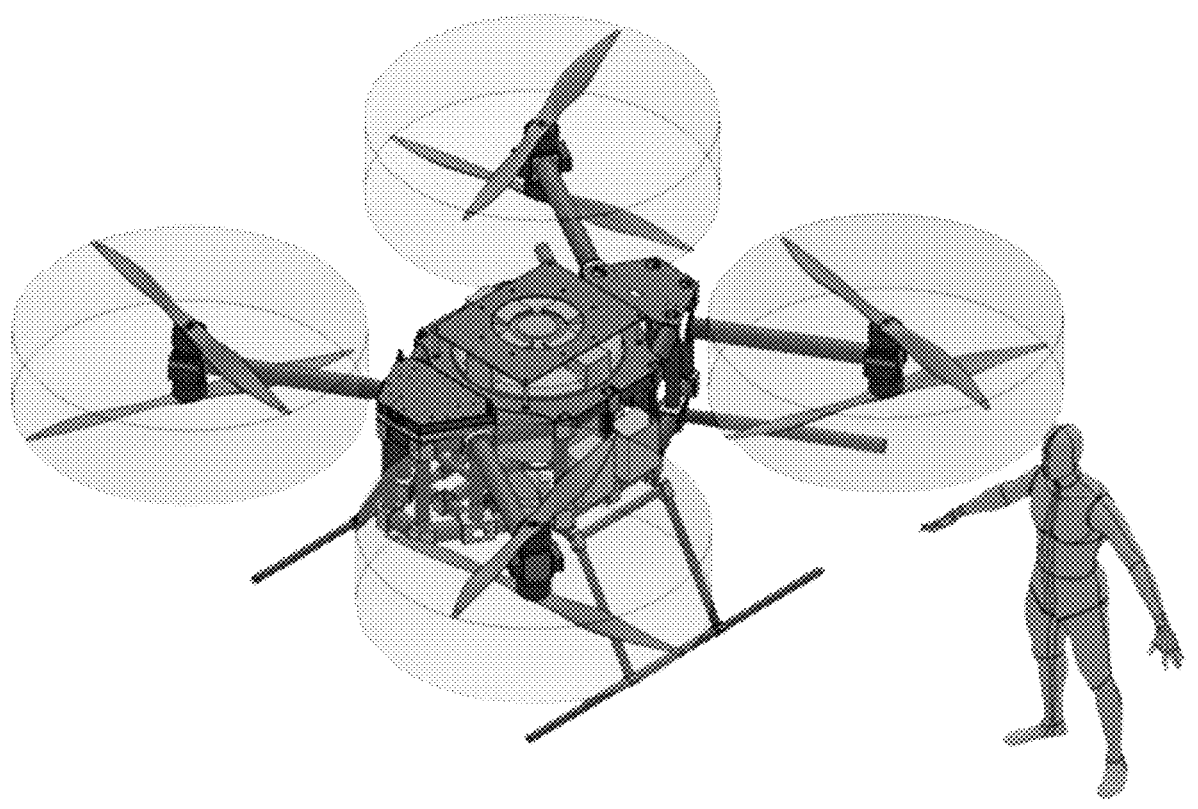
FIG. 5 illustrates another view of the UAV or drone.
Figure 6:
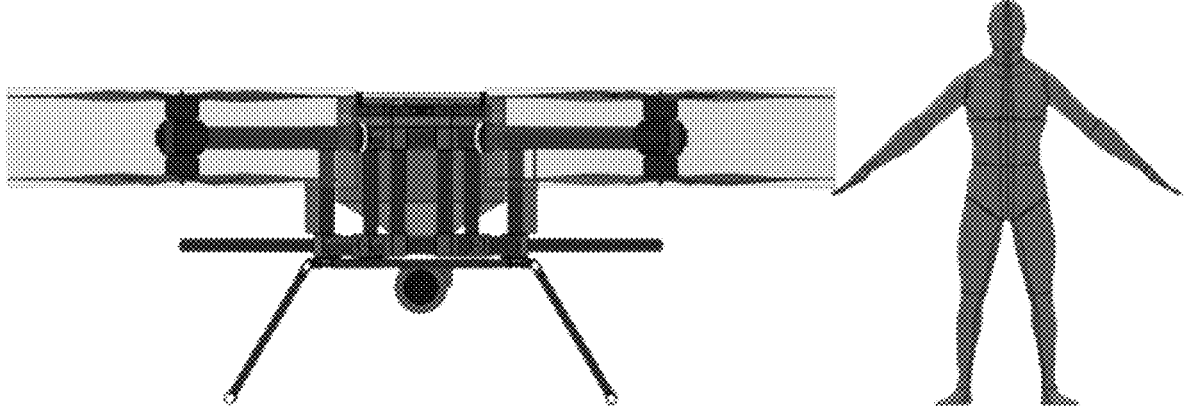
FIG. 6 illustrates a further view of the UAV or drone.
Figure 7:
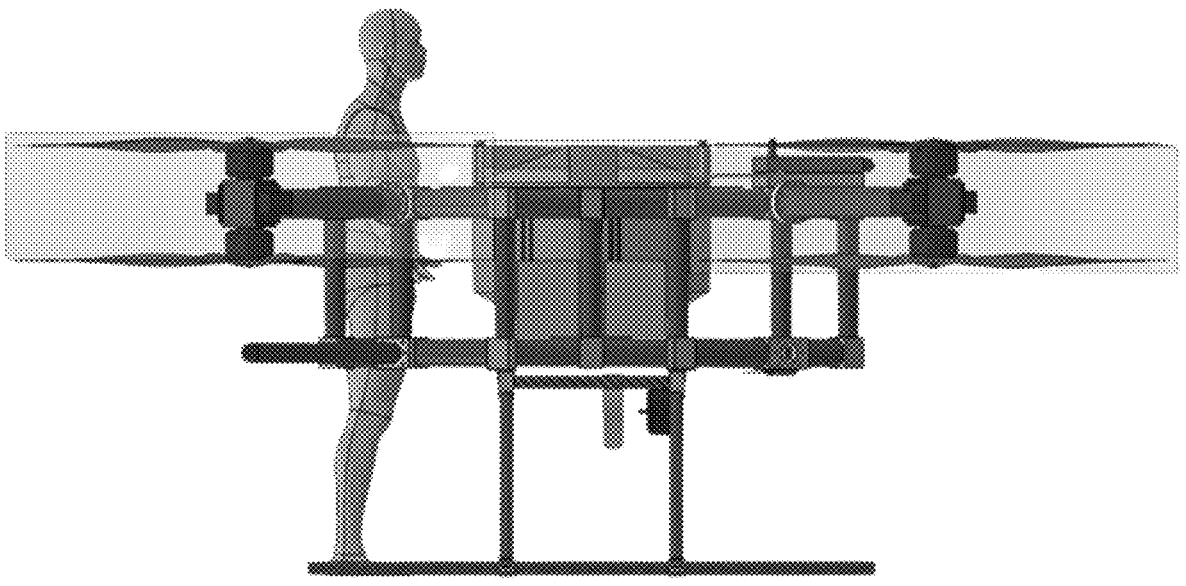
FIG. 7 illustrates a still further view of the UAV or drone.

The UAV and methods described herein are particularly applicable in providing a UAV with a modular, configurable airframe system, especially for a heavy lift rotary wing UAV. FIGS. 5, 6, and 7 further illustrate such a UAV in relative dimensions to a 6 foot person, although the present disclosure is not limited to such dimensions. Generally the diameter of the tubes is large including as large as 3 inch diameter, 3.5 inch diameter, 4 inch diameter, or more to allow ample room for wire harnesses, connectors, conduits, and the like. The tubular protrusions on the hardpoints may be of various lengths, provided sufficient surface area is provided for strong adhesion.

Figure 9:
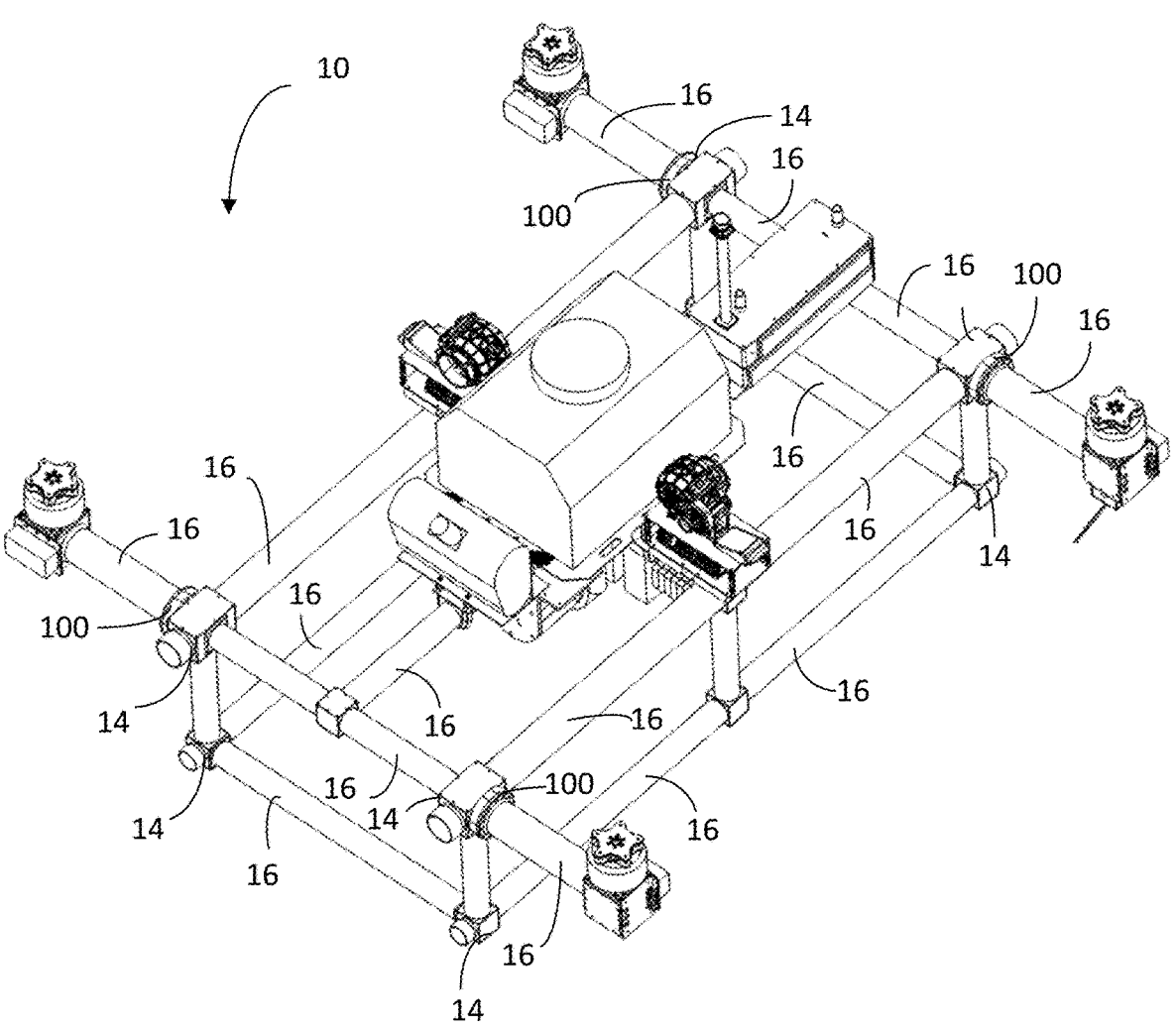
FIG. 9 is a perspective view of the UAV or drone in an alternative configuration and with fracture plates present.

FIG. 9 is a perspective view of the UAV or drone in an alternative configuration and with fracture plates present which service as service joints. Note the same drone parts may be rearranged or re-configured into different configurations as may be appropriate for a particular application. In addition to the modular and configurable air frame system, the air frame system may include pre-engineered fracture points 100. Pre-engineered fracture points 100 may join large subsection of the frame together and serve as service joints. This allows for simplified maintenance because the frame may be assembled or disassembled into smaller subassemblies for maintenance, transport, or repairs. The fracture points 100 may made from high strength engineering polymer or other materials as may be appropriate for a particular design.

Figure 10:
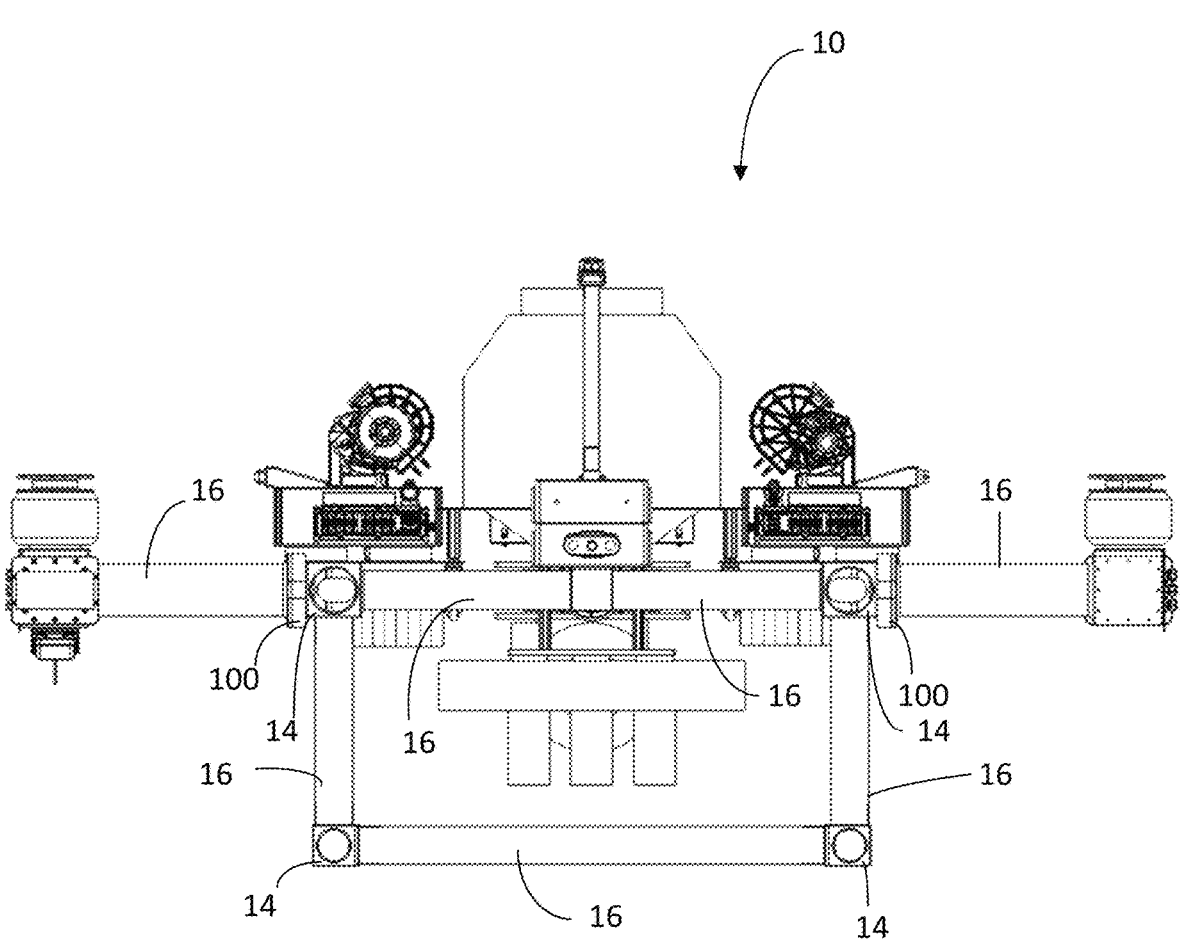
FIG. 10 is an end view of the UAV or drone in the alternative configuration and with the fracture plates present.
Figure 11:
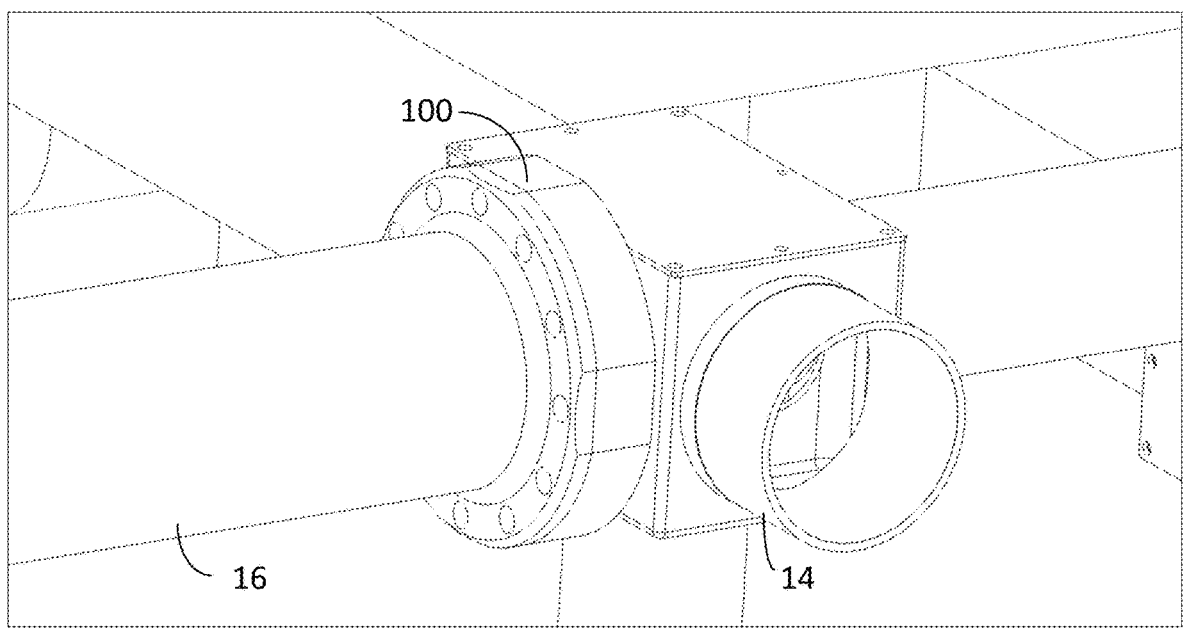
FIG. 11 illustrates a fracture plates in more detail.
Figure 12:
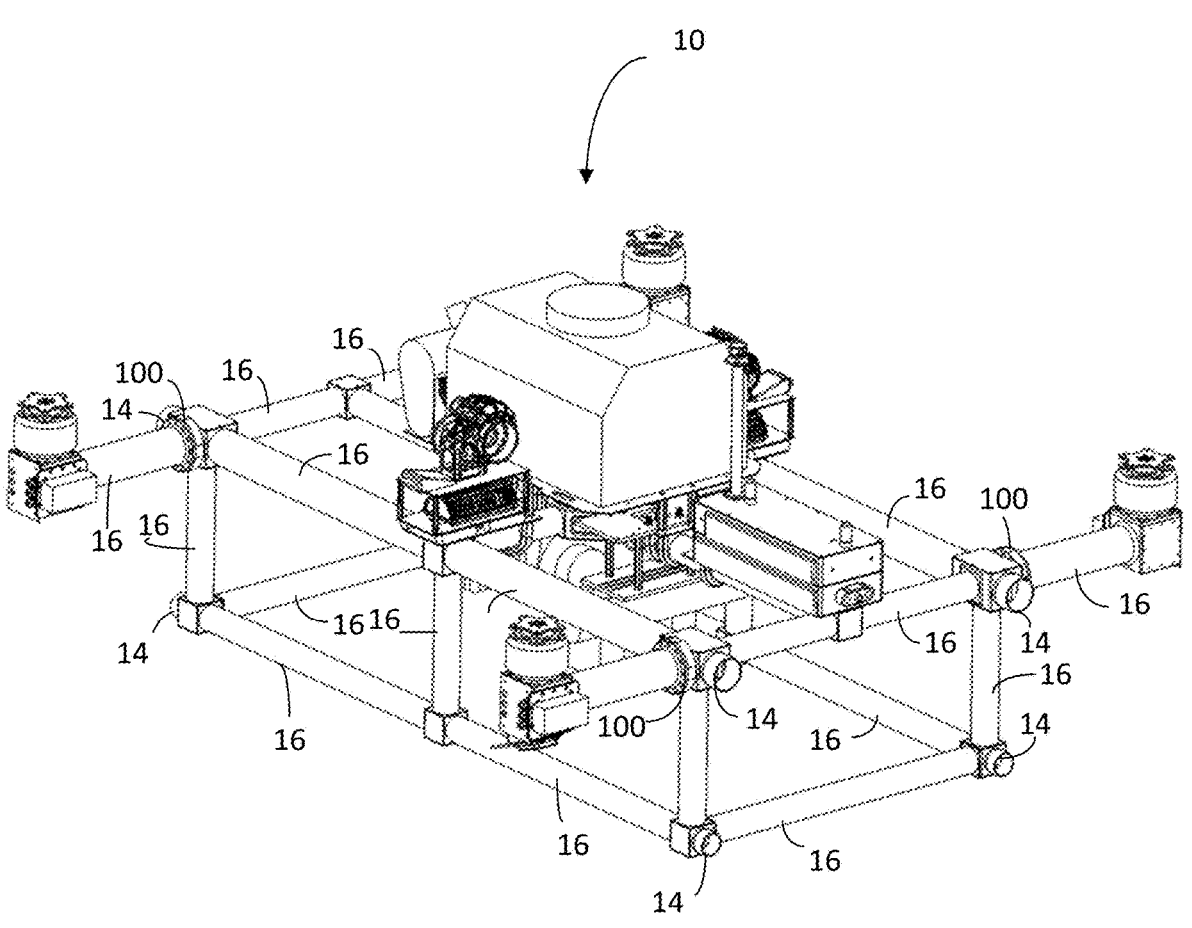
FIG. 12 is a perspective view of the UAV or drone in another alternative configuration with fracture plates present.

FIG. 10 is an end view of the UAV or drone in the alternative configuration and with the fracture plates present. FIG. 11 illustrates a fracture plates in more detail. The fracture plates 100 are integrated into the arm mounting on each vehicle frame such as at a service joint. These fracture plates 100 allow the arms to break away in a crash or hard landing without damaging the rest of the airframe. The fracture plates 100 on both the arms and the select frame joints may be, for example, bolted in place with standard fasteners, and can be replaced quickly by untrained operators using hand tools in the field. FIG. 12 is a perspective view of the UAV or drone in another alternative configuration with fracture plates present.

Although specific embodiments are shown and described herein, it is to be understood that numerous options, variations, and alternatives are contemplated. This includes differences in the size and shape and materials of the hardpoints, differences in the diameter, length, and materials of the tubes. This further includes differences in the number of tubes connected to a particular hardpoint and the angle(s) of one or more tubes connecting to the hardpoint.

Although a specific configuration for spray drone has been shown illustrated to show the airframe surrounding the tank and providing support thereof, it is to be understood that different configurations of hardpoints and tubes may be used for such a mission including based on the size and weight of a loaded tank, other weight considerations for the drone, propulsion capabilities of the drone, environmental considerations, mission duration, or other considerations. In addition, any number of different configurations are contemplated. Indeed, one of the benefits of this disclosure is the ability to quickly adapt an airframe of a drone to accommodate different mission parameters and/or different payload parameters. It is to be further understood that any number of different applications may result in different desired configurations. Such applications may include, without limitation, agricultural uses, forestry uses, cargo and transport, military, transport of people, or other applications.

Therefore, what is shown and described is merely exemplary.

What is claimed is:

1. An unmanned aerial vehicle comprising:
an airframe;
a plurality of rotor assemblies operatively connected to the airframe and configured to propel the unmanned aerial vehicle;
the airframe comprising a plurality of tubes and a plurality of hardpoints;
wherein each of the plurality of hardpoints comprise a tubular protrusion for receiving one of the plurality of tubes; and
structural adhesive bonding the tubular protrusion of each of the plurality of hardpoints to a corresponding one of the plurality of tubes; and
at least one fracture plate operatively connected to one of the plurality of tubes.

2. The unmanned aerial vehicle of claim 1 wherein the plurality of hardpoints comprise a subset of hardpoints configured to place corresponding ones of the plurality of tubes at a first angle and a subset of the hardpoints configured to place corresponding ones of the plurality of tubes at a second angle, the first angle different from the second angle.

3. The unmanned aerial vehicle of claim 2 wherein each of the plurality of tubes is a carbon tube.

4. The unmanned aerial vehicle of claim 3 wherein each of the plurality of hardpoints is metallic.

5. The unmanned aerial vehicle of claim 4 comprising a tank, the tank operatively connected to the airframe.

6. The unmanned aerial vehicle of claim 5 further comprising a sprayer operatively connected to the tank.

7. The unmanned aerial vehicle of claim 5 further comprising a control system operatively connected to the plurality of rotor assemblies.

8. The unmanned aerial vehicle of claim 7 further comprising at least one sensor positioned within at least one of the plurality of tubes.

9. The unmanned aerial vehicle of claim 8 wherein the at least one sensor comprises an accelerometer.

10. The unmanned aerial vehicle of claim 9 further comprising wiring extending through the plurality of tubes.

11. The unmanned aerial vehicle of claim 9 further comprising fuel lines extending through the plurality of tubes.

12. A method of configuring an unmanned aerial vehicle in a first configuration, the method comprising:

providing plurality of carbon tubes and a plurality of metallic hardpoints, wherein the plurality of metallic hardpoints comprises a first subset having at least one tubular protrusion at a first angle and a second subset having at least one tubular protrusion at a second angle, the first angle different from the second angle;

assembling an airframe by structurally bonding individual ones of the carbon tubes to corresponding ones of the plurality of metallic hardpoints to form an airframe of a desired configuration; and routing at least one of tubing, wiring, and fuel lines through the plurality of carbon tubes; and reconfiguring the unmanned aerial vehicle after a mission by heating structural bonds between the carbon tubes and the plurality of metallic hardpoints to separate and assembling the airframe in a second configuration, the second configuration different from the first configuration.

13. The method of claim 12 further comprising positioning at least one sensor within at least one of the plurality of carbon tubes.

14. The method of claim 13 wherein the at least one sensor comprises an inertial sensor.

15. The method of claim 12 further comprising connecting the airframe to at least one rotor assembly.

16. The method of claim 15 further comprising connecting a payload to the airframe.

17. The method of claim 15 further comprising connecting mission specific components to the airframe.

18. The method of claim 17 wherein the mission specific components comprise a tank and a sprayer.

19. The method of claim 15 further comprising assembling a subsection of the air frame at a fracture point.

20. The method of claim 15 further comprising disassembling a subsection of the air frame at a fracture point.

\* \* \* \* \*